HIGH PRESSURE VAPOR DISCHARGE LAMP WITH CESIUM IODIDE
Original Filed July 3, 1967
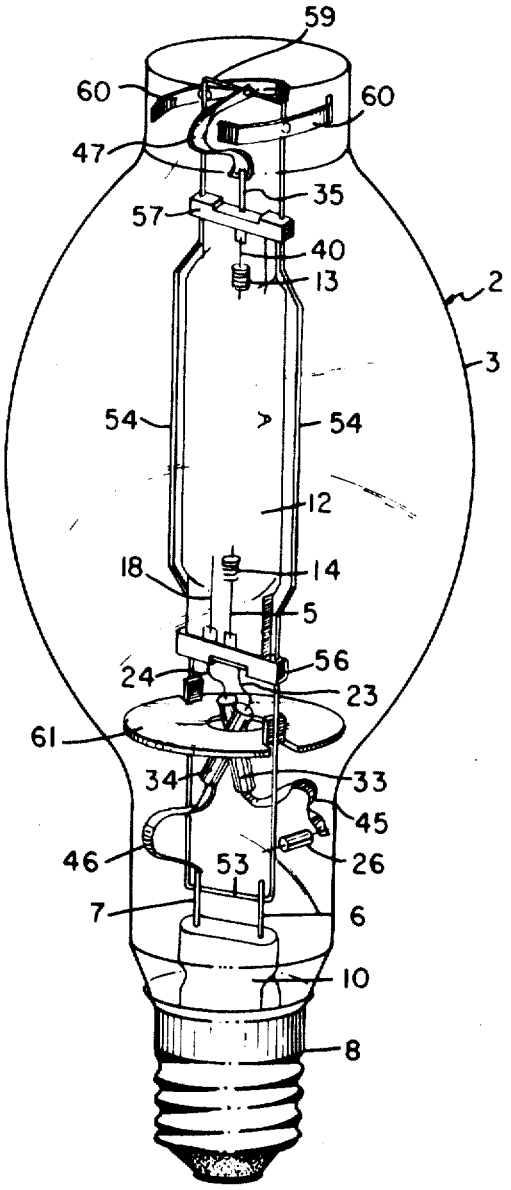

United States Patent Office

Re. 27,953
Reissued Mar. 26, 1974

27,953

HIGH PRESSURE VAPOR DISCHARGE LAMP WITH CESIUM IODIDE

Warren C. Gungle, Danvers, Frederic Koury, Lexington, and John F. Waymouth, Marblehead, Mass., assignors to Sylvania Electric Products Inc.

Original No. 3,514,659, dated May 26, 1970, Ser. No. 651,010, July 3, 1967. Application for reissue Jan. 26, 1972, Ser. No. 221,108

Int. Cl. H01j *61/18*

U.S. Cl. 313—184 4 Claims

Matter enclosed in heavy brackets [ ] appears in the original patent but forms no part of this reissue specification; matter printed in italics indicates the additions made by reissue.

ABSTRACT OF THE DISCLOSURE

The addition of cesium atoms as the halide to a discharge device containing a fill of mercury, halogen and light emitting metal(s) will control the reignition voltage of such devices.

BACKGROUND OF THE INVENTION

Field of the invention

This invention relates to high pressure electric discharge devices and particularly to those which contain fills of atoms of mercury, halogen and light emitting metal(s).

Description of the prior art

In high pressure electric discharge devices utilizing AC voltage, there is an interruption of current flow twice during each cycle. Before the current flow can be restarted, the voltage applied to the discharge must effect two phenomena: (1) The establishment of an electrode as a cathode which was the anode during the previous half cycle (2) re-establish a minimum conductivity to the plasma. The amount of voltage required for performance of these tasks is dependent upon the pressure and composition of the discharge.

For arc discharges operating at pressures of one to two atmosphere, thermodynamic equilibrium exists. A discharge of this nature will have a significant heat capacity. As a result, the gas temperature and the associated plasma conductivity will exhibit only relatively small fluctuations even though the applied voltage has a sinusoidal variation. At these pressures, the applied voltage need only establish an electrode as a cathode prior to the effective passage of current through the device.

By contrast, the low-pressure discharge operating on AC is characterized by large fluctuations in arc temperature and in conductivity. The fluctuations of the conductivity follow the sinusoidal fluctuation of the applied voltage and the heat capacity in inconsequential in maintaining high arc temperature and a carryover of lamp conductivity from one half cycle to the next. During the period of reversal of polarity of applied voltage, any electron-ion loss mechanism will be instrumental in reducing the plasma conductivity. Depending upon the rate of loss of conducting species, the "effective" temperature and the instantaneous lamp pressure, the reignition voltage required to establish a minimum plasma conductivity may approach and even surpass the initial breakdown voltage of the device.

Upon initial ignition, the pressure of the lamp containing mercury, halogen and a light emitting metal corresponds to that of the fill gas and is of the order of 20 torr. During the period of pressure build-up, which is of the order of two or three minutes, the metal iodide lamp will exhibit some characteristics of low-pressure operation. During the period of AC voltage reversal, the instantaneous power dissipated in the plasma will go to zero. The electrical conductivity will decrease and the reignition voltage will climb.

In such lamps, the peak voltage required to reignite the discharge in the period of low pressure may rise to a value higher than available from the auxiliary equipment and the lamp will extinguish.

SUMMARY OF THE INVENTION

We have discovered that reignition voltages of metal iodide lamps can be controlled by the chemical composition of the arc tube filling ingredients. We have found that free mercuric iodide in the arc tube during the warm up phase of lamp operation results in high values of reignition voltage. To prevent the formation of free mercuric iodide, it is customary to limit the quantity of the mercuric iodide added to the arc tube to an amount less than that which would stoichiometrically form the iodide at the highest oxidation state of the added multivalent light emitting metal (LEM). However, it is believed that not all of the multivalent light emitting metal reacts with iodine to form that molecular species which has the highest oxidation state. Thus, for example, when the arc is operating, free iodine can be present as follows:

$$(LEM)+zHgI_2 \rightarrow (LEM)I_2+(LEM)I_3+zHg+xI$$

(wherein x is less than 2z). And therefore, there is in fact, an excess of mercuric iodide over that which is required to form light emitting metal iodide from all the light emitting metal which actually reacts.

Despite attempts to prevent the occurrence of mercuric iodide in an operating lamp after aging, nevertheless, such molecules can remain and in those cases, the reignition voltages are quite high. Quite unexpectedly, we have discovered that the addition of cesium iodide appears to promote the reaction between the light emitting metal and the mercuric iodide or conversely, may form an additional compound which incorporates more iodine and prevents the formation of mercuric iodide.

BRIEF DESCRIPTION OF THE DRAWING

The figure is a perspective view of a high pressure electric discharge device containing the filling of materials of the present invention.

DESCRIPTION OF THE PREFERRED EMBODIMENT

The device, such as shown in the drawing, comprises an outer vitreous envelope or jacket 2 of generally tubular form having a central bulbous portion 3. The jacket is provided at its end with a re-entrant stem having a press seal through which extend relatively stiff lead-in wires 6 and 7 connected at their outer ends to the electrical contacts of the usual screw type base 8 and at their inner ends to the arc tube and the harness.

The arc tube is generally made of quartz although other types of glass may be used such as alumina glass or Vycor, the latter being a glass of substantially pure silica. Sealed in the arc tube 12 at the opposite ends thereof are main discharge electrodes 13 and 14 which are supported on lead-in wires 4 and 5 respectively. Each main electrode comprises a core portion which may be a prolongation of the lead-in wires 4 and 5 and may be prepared of a suitable metal such as for example molybdenum or tungsten. The prolongations of these lead-in wires 4 and 5 can be surrounded by tungsten wire helixes.

An auxiliary starting probe or electrode 18, generally prepared of tantalum or tungsten is provided at the base end of the arc tube 12 adjacent the main electrode 14 and comprises an inwardly projecting end of another lead-in wire.

Each of the current lead-in wires described have their ends welded to intermediate foils sections of molybdenum which are hermetically sealed within the pinch sealed portions of the arc tube. The foil sections are very thin, for example approximately $8\times10^{-4}$ inch thick, and go into tension without rupturing or scaling off when the heated arc tube cools. Relatively short molybdenum wires 23, 24 and 25 are welded in the outer ends of the foil and serve to convey current to the various electrodes inside the arc tube 12.

Metals strips 45 and 46 are welded onto the lead-in wires 23 and 24 respectively. A resistor 26 is welded to foil strip 45 which in turn is welded to the arc tube harness. The resistor may have a value of for example 40,000 ohms and serves to limit current to auxiliary electrode 18 during normal starting of the lamp. Metal foil strip 46 is welded at one end to a piece of molybdenum foil sealed in the arc tube 12 which in turn is welded to main electrodes 13 and 14. Metal foil strip 47 is welded to one end of lead-in 35 and at the other end to the harness. The pinched or flattened end portions of the arc tube 12 form a seal which can be of any desired width and can be made by flattening or compressing end ends of the arc tube 12 while they are heated.

A U-shaped internal wire supporting assembly or arc tube harness serves to maintain the position of the arc tube 12 substantially coaxially within the envelope 2. To support the arc tube 12 within the envelope stiff lead-in wire 6 is welded to the base 53 of the harness. Because stiff lead-in wires 6 and 7 are connected to opposite sides of a power line, they must be insulated from each other, together with all members associated with each of them. Clamps 56 and 57 hold the arc tube 12 at the end portions and are fixedly attached to legs 54 of the harness. A rod 57 bridges the free ends of the U-shaped support wire 54 and is fixedly attached thereto for imparting stability to the structure. The free ends of the U-shaped wire 54 are also provided with a pair of metal springs 60, frictionally engaging the upper tubular portion of the lamp envelope 2. A heat shield 61 is disposed beneath the arc tube 12 and above the resistor 26 to protect the resistor from an excessive heat generated during lamp operation.

The following 45 mm. arc length lamps described in Table I were prepared and contained fills which included 46 mg. of mercury, 7.5 mg. of mercuric iodide, the specified amounts of light emitting metal and the specified amounts of alkali halide. In the table, the operating and reignition voltages are recorded when the various alkali metals are used in arc tubes containing the various light emitting metals.

| LEM (wt.) | Alk | Alkali metal iodine weight, (mgs.) | Starting voltage | Reignition voltage |
|---|---|---|---|---|
| Sc (1.0 mg.) | Na | 19.5 | 250 | 100 |
| Sc (1.0 mg.) | Na | 6.5 | 260 | 145 |
| Sc (1.0 mg.) | Na | 3.3 | 270 | 200 |
| Sc (1.0 mg.) | Cs | 11.4 | 260 | 25 |
| Sc (1.0 mg.) | Cs | 5.7 | 330 | 20 |
| Sc (1.0 mg.) | Cs | 2.3 | 260 | 35 |
| Nb (2.0 mgs.) | Na | 19.5 | 300 | 160 |
| Nb (2.0 mgs.) | Na | 6.5 | 280 | 230 |
| Nb (2.0 mgs.) | Na | 3.3 | 290 | 200 |
| Nb (2.0 mgs.) | Cs | 11.4 | 250 | 70 |
| Nb (2.0 mgs.) | Cs | 5.7 | 260 | 100 |
| Sm (3.3 mgs.) | Cs | 19 | 240 | 35 |
| Sm (3.3 mgs.) | Cs | 6.0 | 240 | 40 |
| Sm (3.3 mgs.) | Li | 17.0 | ---------- | 240 |
| Sm (3.3 mgs.) | Li | 11.0 | 150 | 300 |
| Sm (3.3 mgs.) | Na | 19.5 | 100 | 300 |
| Sm (3.3 mgs.) | Na | 6.5 | 140 | 300 |
| Dy (3.5 mgs.) | Li | 28.5 | 300 | 150 |
| Dy (3.5 mgs.) | Li | 11.0 | 270 | 160 |
| Dy (3.5 mgs.) | Na | 19.5 | 300 | 40 |
| Dy (3.5 mgs.) | Na | 6.5 | 300 | 40 |
| Dy (3.5 mgs.) | Na | 3.3 | 270 | 120 |
| Dy (3.5 mgs.) | Cs | 11 | 240 | 35 |
| Dy (3.5 mgs.) | Cs | 6 | 230 | 35 |
| Dy (3.5 mgs.) | Cs | 2.5 | 280 | 40 |
| V (1.1 mg.) | Na | 19.5 | 290 | 170 |
| V (1.1 mg.) | Na | 6.5 | 280 | 150 |
| V (1.1 mg.) | Na | 3.3 | 260 | 170 |
| V (1.1 mg.) | Cs | 11.4 | 240 | 30 |
| V (1.1 mg.) | Cs | 5.7 | 240 | 30 |
| Lu (3.8 mgs.) | Li | 28 | 270 | 100 |
| Lu (3.8 mgs.) | Li | 11 | 280 | 120 |
| Lu (3.8 mgs.) | Na | 19.5 | 260 | 100 |
| Lu (3.8 mgs.) | Na | 3.3 | 300 | 140 |
| Lu (3.8 mgs.) | Cs | 11 | 218 | 40 |
| Lu (3.8 mgs.) | Cs | 6 | 270 | 80 |
| Th (5.0 mgs.) | Li | 28.5 | 270 | 200 |
| Th (5.0 mgs.) | Li | 17.5 | 280 | 190 |
| Th (5.0 mgs.) | Li | 11.4 | 290 | 200 |
| Th (5.0 mgs.) | Na | 19.5 | 280 | 135 |
| Th (5.0 mgs.) | Na | 6.5 | 270 | 140 |
| Th (5.0 mgs.) | Na | 3.3 | 270 | 210 |
| Th (5.0 mgs.) | Cs | 11.4 | 240 | 20 |
| Th (5.0 mgs.) | Cs | 5.7 | 230 | 20 |
| Th (5.0 mgs.) | Cs | 2.3 | 230 | 1 |

Thus, from the foregoing table, it is apparent that cesium iodide materially reduces the reignition voltages and within the alkali metal series of potassium, lithium and sodium, only cesium uniformly produces such reductions.

The arc tube 12 is provided with a filling of atoms of mercury, halogen, LEM and cesium. Generally mercury atoms are present in quantities between about $1.9\times10^{-4}$ to $1.5\times10^{-7}$ grams atoms per centimeter of arc tube length. The quantity of mercury which is added, either as the element or as the corresponding halide is that which will be completely vaporized at normal operating temperatures of the arc tube and will permit the formation of a restricted arc between the electrodes. The halogen added either as the element or as a compound of mercury, light emitting metal or cesium, is contained within the arc tube in a ratio between about 0.002 to 0.85 atom per atom of mercury. The cesium as the iodide is added in quantities of [$8.5\times10^{-8}$ to $3\times10^{-7}$] *$1.97\times10^{-6}$ to $9.8\times10^{-6}$* gram atoms per cm. of arc length and within such ranges, the reduction of the reignition voltage described herein will be attained.

The quantity of cesium iodide which is added is sufficient to reduce the reignition voltage, but insufficient to cool the arc temperature to a point where the emission lines of the light emitting metal are substantially weakened in the lamp's spectrum. The light emitting metal can be those conventionally used in high pressure electric discharge devices containing fills of mercury and halogen such as, for example, thorium, scandium, vanadium, yttrium, praseodymium, gadolinium, terbium, dysprosium, erbium, thallium, indium, gallium, bismuth, cadmium and/or sodium. These metals can be included in quantities between about $1.2\times10^{-7}$ to $1.2\times10^{-5}$ gm. atoms per centimeter of arc length.

It is apparent that modifications and changes can be made within the spirit and scope of the present invention, but it is our intention only to be limited by the scope of the appended claims.

As our invention, we claim:

1. A high pressure electric discharge lamp comprising an arc tube having sealed ends and electrodes disposed therein; said arc tube containing a fill of atoms of mercury, halogen, light emitting metal together with cesium iodide, said cesium iodide being present in quantities of [$8.5\times10^{-8}$ to $3\times10^{-7}$] *$1.97\times10^{-6}$ to $9.8\times10^{-6}$* moles/cm. arc length to reduce the reignition voltage, but insufficient to cool the arc temperature to a point where the emission lines of the light emitting metal are substantially weakened in the lamp spectrum.

2. The lamp according to claim 1 wherein there are 0.002 to 0.85 atom of halogen per atom of mercury and the mercury content is that which will be completely vaporized at normal operating temperatures of the arc tube and will permit the formation of a restricted arc between the electrodes.

3. The lamp according to claim 1 wherein the light emitting metal is a member selected from the group consisting of thorium, scandium, vanadium, yttrium, praseodymium, gadolinium, terbium, dysprosium, erbium, thallium, indium, gallium, bismuth, cadmium and/or sodium.

4. The lamp according to claim 1 wherein the light emitting metal is between about $1.2\times10^{-7}$ to $1.2\times10^{-5}$ gm. atoms/cm. of arc length.

References Cited

The following references, cited by the Examiner, are of record in the patented file of this patent or the original patent.

UNITED STATES PATENTS

| | | | |
|---|---|---|---|
| 3,262,012 | 7/1966 | Koury et al. | 313—227 X |
| 3,279,877 | 10/1966 | Smith et al. | |
| 3,334,261 | 8/1967 | Butler et al. | 313—229 |
| 3,407,327 | 10/1968 | Koury et al. | 313—229 |

PALMER C. DEMEO, Primary Examiner

U.S. Cl. X.R.

313—229